Aug. 23, 1949.  P. F. ROSSMANN ET AL  2,479,869

METHOD OF MAKING SOUND PICTURE FILMS

Filed April 10, 1948

INVENTOR.
PETER F ROSSMANN
AND KARL RATH

BY

ATTORNEY

Patented Aug. 23, 1949

2,479,869

UNITED STATES PATENT OFFICE 2,479,869

METHOD OF MAKING SOUND PICTURE FILMS

Peter F. Rossmann, Morristown, N. J., and Karl Rath, New York, N. Y.

Application April 10, 1948, Serial No. 20,244

2 Claims. (Cl. 88—16.2)

This application is a continuation-in-part of application Serial Number 743,490 filed April 24, 1947, entitled Means for and method of producing sound films.

The present invention relates to sound motion picture films, more particularly to a novel method of producing sound-on-film records of the type insuring perfect synchronism between the picture and accompanying sounds.

According to known methods of producing sound motion picture films, the sound is recorded photographically upon a narrow strip of the film between the picture areas and the sprocket holes, as in a 35 mm. sound film, or upon a strip along one of the edges of the film in which case only one series of sprocket holes is provided along the opposite edge, as in case of 16 mm. sound film.

Whereas the design of sound picture projectors, especially for the popular 16 mm. film, has made great strides in the past and a great number of projectors are available on the market at a not prohibitive cost for both amateur and professional use, the construction of a simple and cheap portable sound camera of small size and bulk has met with great difficulties due to the relative complexity of the photographic recording devices and the necessity of heavy and bulky auxiliary apparatus, such as amplifiers and electric power supply sources. Thus, the necessary optical and recording equipment, should the amateur want to record his own sound, would cost from two to three times his projector cost, aside from the prohibitive weight and bulk, if ease of operation and portability are desired. This latter requirement applies also to professional or semi-professional use of sound cameras by reporters, travelers, explorers, and all other uses where reduced bulk and size of the equipment are of importance.

A forward step in the solution of producing a simple and low-priced sound camera has been made by the recently announced method of using a magnetic in place of a photographic sound track, consisting of a strip of powdered magnetic material such as iron or the like deposited or coated upon the film in accordance with known magnetic sound recording and reproducing methods.

While such sound-on-film using a magnetic track may be made at a cost far lower than with optical recording devices and with increased simplicity, manufacturers are inclined to proceed slowly in order not to make absolete existing sound projectors for which they are production-tooled and on account of the existence of a large number of professional and amateur sound films provided with photographic sound tracks and being available to the public on both a purchase and rental basis.

Moreover, an advantage of the photographic sound method resides in its ease with which copies or duplicates can be made by means of a simple photographic printing process, whereas in the case of magnetic sound, a new track has to be recorded for each film or copy. While this does not constitute a serious limitation for film intended for amateur use where duplication is only rarely desired, it constitutes a great handicap in case of professional or semi-professional films for both entertainment and instructional purposes, where a great number of duplicates are required.

Furthermore, it has been found that a magnetic sound track applied to a film may be deleteriously affected by the photographic solutions during the film processing operation and it has not been possible in the past to satisfactorily remedy this drawback by either producing a sound track coating which will not be attacked by the developing, fixing or other solutions to which the film is subjected during the processing operation or to produce a suitable inhibitor for substantially preventing any attack upon the sound track coating.

Accordingly, among the objects of the invention is to provide a novel method of making sound-on-film which combines the advantages of both the photographic and magnetic recording methods, substantially without the drawbacks or disadvantages of either.

Another object is to provide a novel method of synchronously recording both picture and sound in a camera and processing the recorded film and sound in a most simple and economical manner, to produce a final sound film suitable for reproduction in a sound-on-film projector.

Another object of the invention is to enable the construction of a simple and low-cost portable sound camera and to provide a simple method of processing sound film.

The above and further objects of the invention will become more apparent from the following detailed description taken in reference to the accompanying drawing forming part of this specification and wherein.

Like reference numerals identify like elements in the different views of the drawing.

Figure 1:
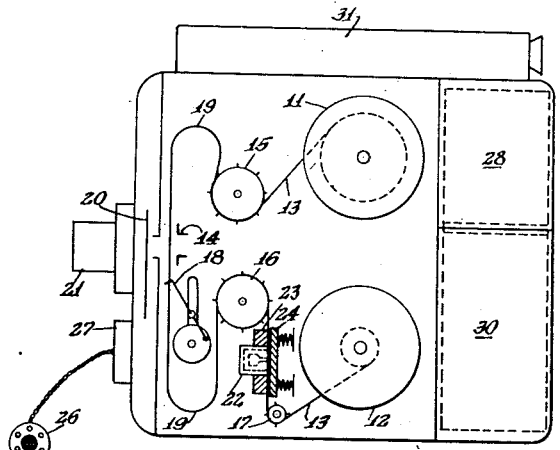
Figure 1 illustrates diagrammatically a portable motion picture camera embodying sound recording apparatus constructed in accordance with the invention.

Referring to Figure 1, there is shown schematically a portable motion picture camera of known construction, comprising a body or casing 10 having mounted therein film supply and take-up spools 11 and 12, respectively, and means for intermittently moving a film 13 through the picture gate 14, said means comprising a number of sprocket or guide rollers 15, 16 and 17 and a reciprocating claw mechanism 18, all of usual construction. The film 13 is arranged to form suitable loops 19 to insure a smooth and uniform movement through the sound pick-up head 22 arranged between the sprockets 16 and 17 of which the former may act as a fly-wheel to further smoothen the movement of the film through the sound recording head. Item 20 indicates the usual shutter and 21 indicates the lens of the camera. The pick-up head 22 through which the film 13 is passed between resilient pressure guides 23 and 24 prior to being wound upon the take-up spool 12, is of the magnetic type described in greater detail hereafter. A microphone 26 preferably mounted upon the front wall of the camera at 27 through a flexible electrical conductor as shown, and an amplifier 28 and battery or power source 30 complete the recording equipment. Item 31 indicates a view finder of any known construction, while other known details of the camera like the driving motor have been omitted from the drawing for simplicity of illustration and as being unnecessary for the understanding of the present invention.

Figure 2:
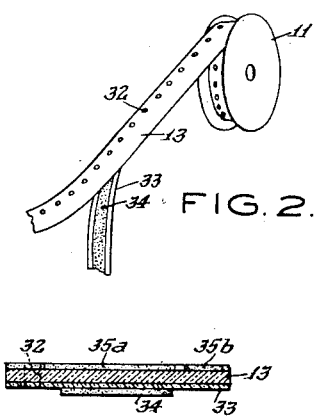
Figure 2 is an isometric fractional view showing a composite sound and picture film of the type according to the invention.

Figure 2 shows the composite sound and picture film 13 according to the invention suitable for use in the camera shown in Figure 1. Said film is provided with both magnetic and photographic sound tracks in accordance with the invention and may be of the known 16 mm. type provided with a single row of sprocket holes 32 along one of its edges, the opposite edge zone upon the emulsion or upper side in the example shown being reserved for a photographic sound track in accordance with well known practice. Alternatively, the film may be of the known 8 mm. type to which a magnetic sound track is applied after the processing operation, said track advantageously occupying the space between the sprocket holes 32 and the adjacent edge of the film.

In the example shown in Figure 2, the side opposite to the emulsion side of the film is backed by a strip or tape 33 of paper, plastic or the like which, if desired, may be slightly or removably affixed to the film by a suitable adhesive in such a manner that it may be easily removed or peeled off in the manner indicated in the drawing. According to one form or practical embodiment, the tape 33 may consist of an adhesive plastic of the type known as Scotch cellulose tape on the market. The tape 33 serves as a separate record carrier and for this purpose contains or has applied to it a magnetic sound track 34 consisting of powdered or finely divided magnetic material. Non-magnetic tapes coated with or having embedded therein a magnetic sound track of this type have already become known in connection with magnetic sound recording and reproducing devices.

The tape 33 may be affixed to the film 13 by an adhesive applied over the entire surface, such as when using Scotch tape or the like, or the tape may be affixed only to the film at discrete and spaced points, so as to facilitate its removability. Alternatively, the film and magnetic tape may be merely superimposed with the natural friction therebetween being sufficient to prevent relative displacement, as will be readily understood.

As the composite film 13 and magnetic sound carrier or tape 33 are passed through the recording head 22, the varying sound currents supplied by the microphone 26 will cause the successive areas of the magnetic track 34 to be subjected to varying degrees of magnetization along the length of the track, in such a manner that if the film is subsequently moved through a suitable pick-up or play-back head, the variable magnetic areas will be converted back to corresponding sound currents suitable for reproduction by a loudspeaker or recording device.

Figure 3:
Figure 3 is a cross-section, on an exaggerated scale, of the film shown in Figure 2.

In Figure 3, there is shown an enlarged cross-section of the film according to Figure 2, numerals 35a and 35b indicating the adjacent picture and photographic sound track emulsion areas, such as is customary with standard 16 mm. sound films. In case of 8 mm. film, the emulsion comprises only picture areas, while a magnetic track may be applied after the photographic processing operation, in a manner described in greater detail hereafter.

Figure 4:
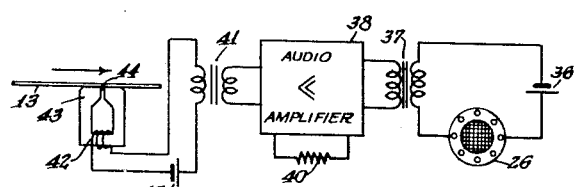
Figure 4 is an electrical circuit diagram of the sound recording system embodied in Figure 1.

In Figure 4 there is shown a complete electrical circuit diagram of the magnetic recording system for the camera as shown in Figure 1. The microphone 26 is connected in a known manner in series with a suitable current source such as a dry battery 36 and the primary winding of an audio transformer 37 whose secondary winding serves to energize the input of an audio frequency amplifier 38. The latter is preferably of the electronic type using miniature or sub-miniature tubes to reduce bulk and weight of the equipment. Such amplifiers are well known from the construction of hearing aids, pocket radios and the like.

The amplified sound currents supplied by the output of the amplifier 38 are applied by way of a further audio transformer 41 to the exciting coil 42 of a magnetic recording device embodied in the pick-up head 22 of Figure 1, said recording device, in the example shown, comprising a magnet 43 having a pair of pole pieces shaped to provide a narrow air gap 44 over which is passed the film 13 and sound track 34 in a manner readily understood. In order to suitably electrically bias the recording device so as to operate upon the straight line portion of its magnetic characteristic, a biasing voltage source 45 such as a dry battery is shown connected in series with the recording coil 42. The film 13 may be held in close contact with the gap 44 by any suitable means, such as by the provision of resiliently mounted pressure plates or guides 23 and 24 as shown in Figure 1.

Before the film 13 is passed through the recording device it is advantageously passed through a quenching or erasing device (not shown) which may be of substantially the same type as the recording device or of any other design known in the art. Thus, in place of using an electromagnet, the erasing action may be effected by a permanent magnet producing a sufficiently strong magnetic saturation field or a high frequency current may be employed for quenching or demagnetizing the sound track in accordance with well known practice. According to an alternative procedure, the erasing of any magnetic irregularities may also be carried out during the manufacture of the film. Since the films are usually sold in metal cans, the latter act as a shield against variable external magnetic fields. In this case, a special quenching or erasing device may be dispensed within the camera, thus resulting in further simplification and reduction of weight of the recording device. Other details well known in the art of electromagnetic sound recording have been omitted from the drawing for the sake of simplicity of illustration.

Although separate batteries have been shown for the microphone and the recording devices, it is understood that a single battery or current source may be employed. The latter may also serve to provide the filament and space currents for the amplifier 38, or separate low voltage or high voltage batteries may be used mounted in the space 30 of Figure 1. In order to further reduce the battery space and weight, the plate voltage for the amplifier may be derived from a common low voltage battery by means of a vibrator-rectifier type direct current transformer well known in the art and comprising either a self-interrupting vibrator or an interrupter operated by the driving motor of the camera. Alternatively, all of the power sources together or without the amplifier may be combined into a unit assembled in a separate case wearable by a shoulder strap and electrically connectable with the camera through a flexible cord or conductor. The amplifier 38 is advantageously provided with an automatic volume control circuit of any known type as indicated in the drawing by a resistance 40 connecting an element at the output of the amplifier producing a gain control potential with a gain control element at the input of the amplifier. In this manner, a substantially uniform sound output is insured, whereby to enable the photographer to direct all his attention to the operation of the camera and the composition of the picture.

After both picture and sound have been recorded in the manner described, the film is forwarded to the processing station for development in the usual manner. However, contrary to the usual development, the magnetic sound record is first converted into a photographic sound record upon the same film, whereupon the film may be developed in the usual manner to be ready for projection by a standard sound-on-film projector or for duplication by printing copies thereof in any desired number.

Figure 5:
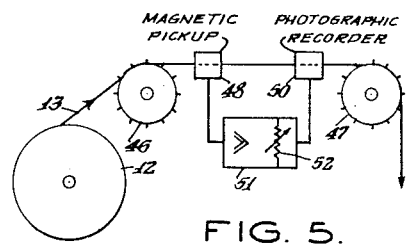
Figure 5 illustrates schematically a processing arrangement for converting the recorded magnetic sound into photographic sound in accordance with the invention.

Thus, referring to Figure 5, the film from the exposed spool 12 is shown to be passed, by way of guide sprockets 46 and 47 and by means of a suitable constant speed drive, first through a magnetic pick-up device 48 which may be similar to the recording device shown in Figure 4 and thereafter through a standard photographic sound recorder 50. The sound output currents reproduced from track 34 by the pick-up 48 are sufficiently amplified by means of an amplifier 51 and applied to the recorder 50. After the photographic sound track has been recorded upon the area 35b of the film next to the picture area 35a, the magnetic sound carrier or tape 33 is removed by simply peeling it off the film and the latter developed in the ordinary manner to produce a final photographic sound film ready for use in a standard sound-on-film projector. In this manner, any damage to the magnetic sound track by the photographic processing solution is substantially avoided.

The transfer from magnetic to photographic sound is advantageously utilized for editing or monitoring purposes by controlling the volume of the amplified sound by means of a suitable volume control resistor 52. An advantage of the invention in this connection is the fact that undesirable portions of the recorded sound may be eliminated by means of a simple erasing magnet and an electric switch for applying the magnetic field and dubbing in other sounds or music by applying corresponding sound currents to the input of the amplifier 51. In the case of photographic recordings, this is possible only with elaborate auxiliary devices and by printing a completely new film.

As pointed out above, the magnetic sound track may consist of any of the known materials such as ferric oxide or nickel-cobalt in the form of a dispersion or powder mixed with a suitable binder. Experience has shown that with coated recording materials of this type, it is possible to record sound frequencies up to 5,000 cycles per second at a speed of the sound track of 8 inches per second, which corresponds to the normal speed of 16 mm. film. This insures sufficient fidelity for both voice and musical reproduction comparable with the quality of known photographic sound records.

In using a sound track according to the invention, the width of the track 34 overlying the picture emulsion area 35a may be increased to improve the quality and efficiency of recording and reproducing, as well as to simplify the recording apparatus, as will be understood. This constitutes a further advantage of the invention over magnetic sound films having track limited to a narrow strip along the edge of the film and in turn results in a further reduction of bulk and simplified operation of the equipment in the camera.

From the foregoing, it will be evident that the invention as exemplified by Figures 2 and 3 of the drawing combines the advantageous features of both magnetic and photographic sound recording, while avoiding the disadvantages of either, aside from the main advantage of reducing the cost and amount of equipment required in a sound film camera and enabling the use of existing sound-on-film projectors and other auxiliary equipment. Thus, the advantages of the optical sound track due to the absence of any direct contact of the recording and reproducing heads with the film and consequent prevention of wear and clogging, are substantially insured by the invention, inasmuch as the film is passed only once through the magnetic recording and reproducing devices and is then exclusively used for optical sound reproduction in the projector. The same applies to the case of duplication by direct contact printing. On the other hand, the invention overcomes in a most simple manner, the disadvantages of the optical recording in a camera consisting in the relatively high cost, complexity of the recording equipment and the impossibility of monitoring the film immediately after recording.

As is understood, the invention is not limited to sound films of the type wherein the final sound record is in the form of a photographic sound track as described above, but applies equally to film having any type of sound track such as a mechanical or magnetic sound track adapted for reproduction in a suitable sound-on-film projector. Such a film has special advantages in the 8 mm. field where photographic sound recording and processing involves substantial difficulties while the use of a magnetic sound track preferably applied between the sprocket holes and the adjacent edge of the film has been found to provide satisfactory results in practice.

Figure 6:
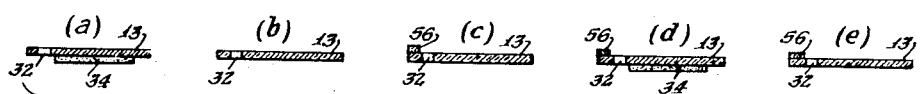
Figures 6 and 7 illustrate a modified process and arrangement, respectively, for producing a sound film in accordance with the invention.
Figure 7:
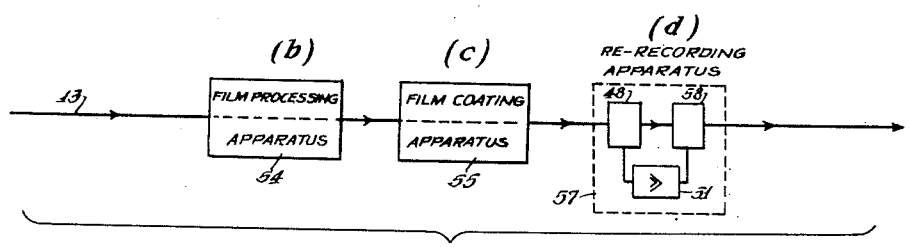

Referring to Figures 6 and 7, there is shown a method of producing a magnetic sound film in accordance with the principles of the invention and being substantially free of the drawbacks and difficulties encountered in previous magnetic sound film systems. Figures 6a to 6e show the film 13 which may be a standard single 8 mm. film in cross-section during the successive recording and processing operations, while Figures 7a and 7e illustrate the film during its passage through the various processing devices. After the picture upon the film 13 and the accompanying sound upon the magnetic sound track 34 have been recorded in a camera, the magnetic track or tape 34 is removed as shown in Figure 6b and the film passed through a standard photographic processing apparatus 54, Figure 7b. After the film has been sufficiently dried, it is coated with a magnetic layer 56, preferably applied to the area between the sprocket holes 32 and the adjacent edge of the film, Figure 6c, by passing the film through a suitable coating apparatus 55, Figure 7c. Thereafter the film thus provided with the magnetic sound track 56 has the tape 34 re-applied to it, as shown in Figure 6d, and is then passed through a reproducing and recording device 57, Figure 7d, for transferring the magnetic record upon the tape 34 onto the magnetic track 56, in substantially the same manner as in the case of Figure 5. The only difference of the apparatus 56 of Figure 6d from that of Figure 5 consists in the provision of a magnetic recording device 58 in place of the photographic recorder 50 of Figure 5. Thereupon, the film 13 is again freed from the magnetic tape 34 as shown in Figure 6e, thus providing a final magnetic sound film adapted for reproduction in a suitable magnetic sound-on-film projector.

As pointed out a method as illustrated in Figures 6 and 7 is especially suitable for 8 mm. amateur sound film where duplicates are only seldom required, but where the use of a separate picture and sound track carrier during the recording and processing operations substantially overcomes the difficulties heretofore encountered in connection with magnetic sound-on-film systems. In case of double -8 mm. film, the tape 33 may be provided with a double magnetic sound track and the film processed in substantially the same manner as described, with the only difference that the film is run twice through the camera and re-recording apparatus 57 in opposite directions.

It will be understood that the magnetic sound track upon the tape or carrier 34 may be either of the type applied to the carrier in the form of a separate layer or coating of finely divided magnetic material or of the type with the magnetic powder being mixed with or embedded in the carrier material during the manufacture of the latter, in accordance with well known practice in the art.

It will also be evident from the foregoing that a major advantage of the method according to the invention is due to the fact that the picture and sound may be recorded in perfect synchronism in a camera in a most simple and economical manner on the one hand, while the recorded magnetic sound may be transferred onto a separate photographic, magnetic or other sound track permanently applied to the picture film also in perfect synchronism with the recorded picture, substantially without the defects and drawbacks inherent in previous sound-on-film systems of both the photographic, magnetic or other types known in the art.

The magnetic tape 33 may have a width less than the film 13, as shown in Figure 3, or it may be of the same width as the film in which case it is provided with sprocket holes similar to and registering with the sprocket holes of the film. In order to insure perfect synchronism, both the film and tape may be furthermore provided with suitable synchronizing marks at the beginnings and ends and/or a number of intermediate points, in a manner as will be readily understood.

According to a further feature of the invention, the microphone 26 shown in Figure 4 may be of the simple magnetic type which operates without an exciting battery or other power source and simply comprises a permanent magnetic core and a flexible diaphragm arranged to act as an armature for said core. Sound waves impinged upon said diaphragm will cause the generation of a corresponding varying electric voltage in a winding mounted upon said core, due to the variation of the magnetic reluctance of the air gap between said core and diaphragm. The generated sound voltages or currents may be amplified and the amplified current utilized for exciting the magnetic recording winding 42, in substantially the same manner as shown in Figure 4. As a result, a separate microphone battery 36 is dispensed with, thus further simplifying the sound recording apparatus of the camera.

According to a further simplification, the sound amplifier 38 in Figure 4 may also be omitted and the generated sound currents obtained from a magnetic microphone of the aforementioned type directly applied, if necessary by way of a suitable transformer, to the recording winding 42. In this case, no electric power source, with the exception of the biasing source 45 for the magnetic receiver, will be required and the magnetic recording apparatus reduced to a minimum of parts and bulk. This is of special importance for small portable cameras of the popular 8 mm. type.

Figure 8:
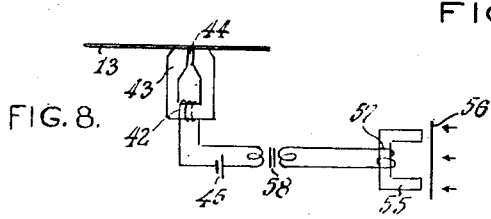
Figure 8 shows a modification of an improved sound recording system for a camera in accordance with the invention.

An arrangement of this type is shown in Figure 8, wherein numeral 55 shows the permanent magnet, 56 the diaphragm, 57 the microphone winding and 58 the transformer for matching the different impedances of windings 42 and 57.

In an arrangement of this type, the magnetic sound recorded upon the tape 34 may be too weak for direct reproduction in a simple and low-priced magnetic sound-on-film projector. This, however, does not constitute any great handicap in connection with a system and method according to the invention, since the recorded magnetic sound will be rerecorded or transferred from the tape 34 onto the film 13, for which purpose the initially weak recorded sound may be sufficiently amplified by means of a low noise-level, high gain amplifier 51, Figures 5 and 7, especially designed for this purpose. Both the camera and projector, on the other hand, can be of simple and relatively cheap construction, whereby to make it possible to produce 8 mm. sound film economically for both home and amateur uses.

It is also understood, that the idea of recording sound in a camera at a level normally too low for reproduction in a standard sound-on-film projector and then bringing up the recording level during a subsequent rerecording process, applies to any kind of recording system and is by no means limited to an arrangement as shown in Figure 8. Thus, in an arrangement according to Figure 4, recording at a sub-standard level will also result in a substantial simplification of the recording operations in requiring a low gain and less expensive amplifier and other simplified circuit elements.

While there have been shown and described a few desirable embodiments of the invention, it is understood that this disclosure is for the purpose of illustration and that various changes in shape, proportion and arrangement of parts, as well as the substitution of equivalent elements and steps for those herein shown and described, may be made without departing from the spirit and scope of the invention as defined in the appended claims. The specification and drawings are accordingly to be regarded in an illustrative rather than a limiting sense.

We claim:

1. The method of making sound motion picture film comprising the steps of superimposing a flexable magnetic sound recording tape upon a photographic film to produce a composite film and sound record strip, producing a latent picture record and a record of sound accompanying the action of the picture upon substantially overlying areas of the superposed film and tape, respectively, thereafter passing the composite strip in succession through a magnetic pick-up and photographic recording device for rerecording the magnetic sound photographically upon said film adjacent to the picture areas, to produce a second latent photographic sound record upon said film, removing said film from said tape, and developing said latent photographic picture and sound records upon said film.

2. The method of making sound motion picture film comprising the steps of applying a flexible adhesive faced sound recording tape to a photographic film to produce a composite film and sound record strip, producing a latent picture record and magnetic record of sound accompanying the picture action upon substantially overlying areas of the superposed film and tape, respectively, thereafter passing the composite strip in succession through a magnetic pick-up and photographic recording device for rerecording the reproduced sound photographically upon said film adjacent to the picture areas, to produce a second latent photographic sound record upon said film, severing said film from said tape, and developing said latent photographic picture and sound records upon said film.

PETER F. ROSSMANN.
KARL RATH.

REFERENCES CITED

The following references are of record in the file of this patent:

UNITED STATES PATENTS

| Number | Name | Date |
| --- | --- | --- |
| 1,466,750 | Peterson | Sept. 4, 1923 |
| 1,653,467 | O'Neill | Dec. 20, 1927 |
| 1,679,708 | Bullis | Aug. 7, 1928 |
| 1,825,598 | Vogt et al. | Sept. 29, 1931 |
| 1,832,097 | Chipman | Nov. 17, 1931 |
| 1,866,712 | Jones | July 12, 1932 |
| 1,949,409 | Cohen | Mar. 6, 1934 |

FOREIGN PATENTS

| Number | Country | Date |
| --- | --- | --- |
| 347,347 | Great Britain | Apr. 30, 1931 |
| 352,825 | Great Britain | July 16, 1931 |